(12) United States Patent
Pöchmüller

(10) Patent No.: US 6,362,773 B1
(45) Date of Patent: Mar. 26, 2002

(54) METHOD FOR DETERMINING RANGE OF VISION

(75) Inventor: Werner Pöchmüller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/603,073

(22) Filed: Jun. 26, 2000

(30) Foreign Application Priority Data

Jun. 24, 1999 (GB) .......................................... 199 28 915

(51) Int. Cl.[7] .............................................. G01S 13/93
(52) U.S. Cl. ............................. 342/52; 342/54; 342/70; 342/118; 342/179; 342/197
(58) Field of Search ............................. 342/70, 71, 72, 342/52, 53, 54, 118, 145, 176, 178, 179, 180, 197

(56) References Cited

U.S. PATENT DOCUMENTS

| 4,214,243 A | * | 7/1980 | Patterson | .................... 342/115 |
|---|---|---|---|---|
| 5,168,214 A | * | 12/1992 | Engeler et al. | .......... 324/76.33 |
| 5,311,192 A | * | 5/1994 | Varga et al. | ................. 342/188 |
| 5,365,239 A | * | 11/1994 | Stillwell, Jr. | ................. 342/368 |
| 5,396,510 A | * | 3/1995 | Wilson | ......................... 356/28 |
| 5,570,691 A | * | 11/1996 | Wright et al. | ................ 600/447 |
| 5,784,023 A | * | 7/1998 | Bluege | ........................ 342/104 |

FOREIGN PATENT DOCUMENTS

DE      195 30 289      2/1997

* cited by examiner

Primary Examiner—John B. Sotomayor
(74) Attorney, Agent, or Firm—Keyon & Kenyon

(57) ABSTRACT

A method via which the range of vision in a vehicle's field of view can be determined precisely, so that with the help of range-of-vision information the driver can be advised to modify his driving style. The contrast of an object detected by a radar or lidar sensor is measured by a monocular video sensor, and the range of vision is determined from the measured values supplied by the radar or lidar sensor and by the monocular video sensor. Alternatively, the distance to and contrast of at least one object can be measured by a binocular video sensor, the range of vision then being determined from the measured contrast and distance values.

24 Claims, 1 Drawing Sheet

METHOD FOR DETERMINING RANGE OF VISION

FIELD OF THE INVENTION

The present invention relates to a method for determining the range of vision in the field of view in front of a vehicle, the contrast of at least one object located in the field of view being measured using video technology.

BACKGROUND INFORMATION

German Published Patent Application No. 195 30 289 describes a plurality of methods for determining range of vision that are based on measuring contrast, absorption and reflection. The document states that contrast can be measured using video technology in order to determine the range of vision, but that this is not suitable for mobile applications in vehicles. Instead, the document proposes that range of vision be measured using the reflection principle, which is based on the backscattering of emitted light off water droplets, e.g., fog, that reduce visibility. The system then sends a signal to the driver if he has not brought the vehicle's speed in line with the range of vision.

Systems for adaptive speed and headway control already exist and are known as ACC (Adaptive Cruise Control) systems. These ACC systems measure the distance between the vehicle and objects located in the area surrounding the vehicle—as a general rule this means other vehicles—using radar or a laser (lidar). Herein, the field of view in front of the vehicle is scanned using a radar or laser beam, and the relative distance and, if necessary, the relative speed relative to the driver's own vehicle is determined from the beams reflected off objects. The information regarding the relative distance and, respectively, relative speed supplied by the ACC system is also used to carry out speed control. ACC systems based on radar or lidar can detect objects in the vehicle's field of view and measure the relative distance even if visibility is reduced, e.g., due to fog, snow or smoke. Because of this capability, the driver may rely on the ACC system and drive very fast even if visibility is significantly reduced. However, compared with a human being, a technical speed control system such as an ACC system can only detect the traffic situation in a very limited manner. It is therefore important that it be possible to deactivate the ACC system in certain traffic situations that the ACC system cannot handle, so that the driver himself controls the vehicle's speed. Particularly in situations where the range of vision in the area surrounding the vehicle is very limited, one cannot leave the task of headway and speed control to the ACC system alone, because the human driver might not recognize soon enough that he is in a traffic situation that the ACC system cannot handle and thus might not intervene in the speed control system.

SUMMARY OF THE INVENTION

An object of the present invention therefore is to provide a method that allows the range of vision in the vehicle's field of view to be determined as precisely as possible, so that with the help of the range of vision information the driver can be advised to modify his driving style.

According to the method according to the present invention, a monocular video sensor measures the contrast of the object detected by the radar or lidar sensor, and the distance to at least one object in the vehicle's field of view measured by the radar or lidar sensor and the contrast of the object in question measured by the monocular video sensor are used to determine the range of vision.

According to another exemplary embodiment of the present invention, a binocular video sensor measures the distance to and contrast of at least one object, and the range of vision is determined from the measured contrast and measured distance values. In both methods, a distance measurement and a contrast measurement are taken, which means the range of vision in the vehicle's field of view can be determined with great precision. In both cases, the contrast is measured using a passive video sensor system. Here, passive means that the field of view in which measurements are taken is not lit using an own light source, but rather only the light emitted by the field of view itself is recorded by the video sensor system.

Thus the distance measurement can be taken by the binocular video sensor as well as by a radar or lidar sensor. The advantage of this is that structures such as lane markings that can only be detected using a video sensor may be used to determine the range of vision as well as structures detectable by the radar sensor or lidar sensor. Aside from this, the advantage of using a video sensor is that it can be used not just to determine the range of vision but also to gather further information regarding the vehicle's immediate environment, e.g., the course of the lane, road signs and similar.

It is usefull if the measured distance to an object whose measured contrast is still adequately detectable by the human eye is considered the range of vision. The video sensor should be brought in line with the wavelength range that is detectable by the human eye.

Preferably, the contrast measurement carried out by the video sensor is oriented to an object whose distance relative to the vehicle is changing. The contrast measurement and the distance measurement are then carried out iteratively.

It is useful to calculate the mean of the measured distances to different objects whose contrast constitutes a minimum value still adequately detectable by the human eye, which then indicates the range of vision. Alternatively, the range of vision is considered the greatest distance among the distances to different objects whose contrast constitutes a minimum value still detectable by the human eye. One can achieve a more precise result from measurements if each contrast measurement is carried out a plurality of times and a mean contrast value is determined from all the measurements.

To achieve a higher resolution in contrast measurement, it is useful to use a video sensor that has a non-linear transducer characteristic curve, the gradient of the characteristic curve decreasing as the light intensity increases.

It is advantageous if a headway control device in the vehicle is deactivated if the range of vision that has been determined falls below a minimum value.

The vehicle's maximum desired speed may also be controlled as a function of the current range of vision that has been determined. It is useful to indicate the current range of vision to the driver inside the vehicle, or to send a signal to the driver indicating that the headway control device has been deactivated, or to send a signal to the driver indicating that the maximum desired speed that he has predefined has been reduced based on the current range of vision. All this information is used to advise the driver to modify his driving style if the range of vision is limited.

DETAILED DESCRIPTION

Figure 1:
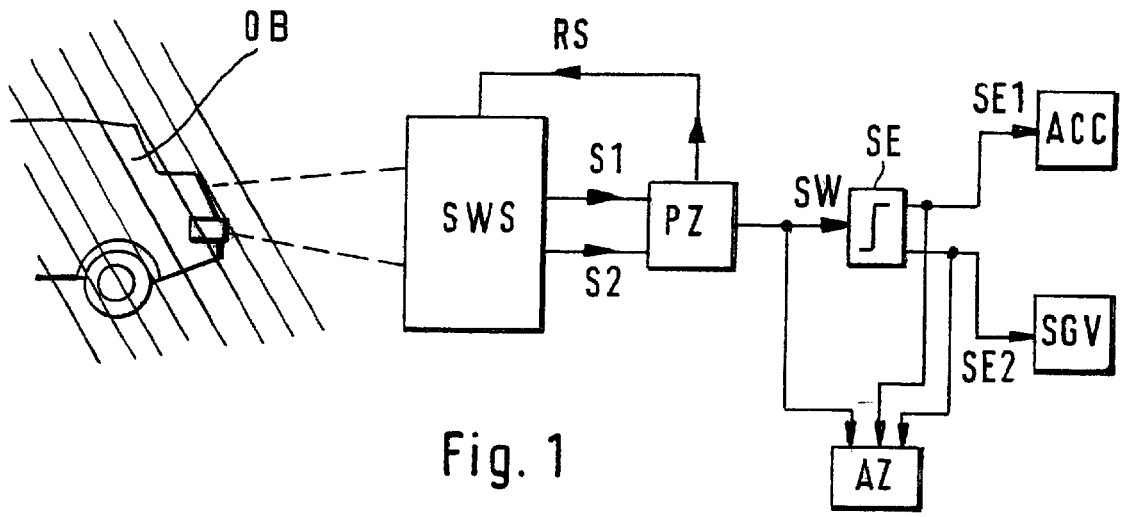
FIG. 1 shows a block diagram of a device for determining range of vision.

FIG. 1 shows a block diagram for a device for determining the range of vision in the field of view in front of a vehicle. An object OB is shown in the vehicle's field of view; in this case it is, for example, another vehicle. The shading indicates that the range of vision in the field of view is reduced by fog, snow or smoke, for example.

The device has a range-of-vision sensor SWS, which measures the distance to one or more objects OB and also measures the contrast of this or these objects OB using a passive video sensor. If, in the case of an object, contrast that corresponds to the minimum value still detectable by the human eye is measured, the distance to this object is considered the range of vision. Range-of-vision sensor SWS sends a plurality of signals S1, S2 containing information regarding the measured distance and the measured contrast to a processor PZ which determines the range of vision from the measured values.

Figure 2:
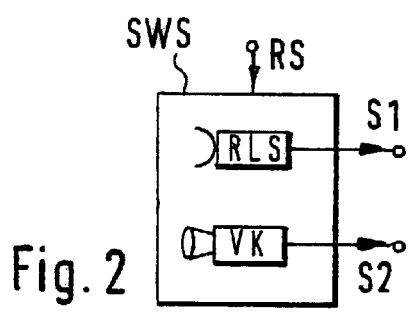
FIG. 2 shows a range-of-vision sensor having a monocular video sensor.
Figure 3:
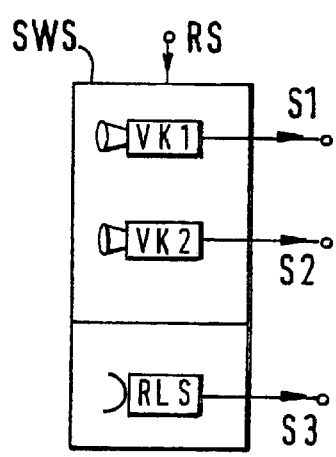
FIG. 3 shows a range-of-vision sensor having a binocular video sensor.

FIGS. 2 and 3 show two different systems for a range-of-vision sensor SWS. According to FIG. 2, range-of-vision sensor SWS includes a radar or lidar sensor RLS, which is actually installed in the vehicle as part of an ACC system for controlling the headway interval and speed, and a monocular video sensor of a video camera that is known per se. Video camera VK should be set up for an optical wavelength range that has been brought in line with the wavelength range of the human eye. Thus the contrast values measured by video camera VK roughly correspond to the contrast ranges detectable by the human eye. Radar or lidar sensor RLS measures the relative distance to an object OB relative to the driver's own vehicle, regardless of whether the range of vision is reduced by, for example, fog, snow, or smoke. Video camera VK takes a picture of that same object and measures the contrast of this object relative to its surrounding area. The distance measurement and the contrast measurement are taken iteratively, so that in the case of a change in the headway interval between object OB and the driver's own vehicle, output data S1 and S2 of range-of-vision sensor SWS supply distance-based contrast information to processor PZ. Processor PZ compares the measured contrast values with a threshold that represents contrast that is still adequately detectable by the human eye. The measured distance that corresponds to a measured contrast value that is equal to or less than the threshold is considered maximum possible range of vision SW in the field of view.

As stated above, in order to allow distance and contrast measurements to be taken iteratively, radar or lidar sensor RLS and video camera VK should be oriented to an object whose relative speed relative to the driver's own vehicle is changing fairly quickly. Preferably, these are objects that are immovably fixed at the side of the road, relative to which the vehicle is changing its headway interval as it travels forwards.

A more precise contrast measurement can be achieved by carrying out each contrast measurement a plurality of times and calculating a mean contrast value from all the measurements. To achieve an even more precise measurement of range of vision, it is useful if distance and contrast measurements are taken for different objects in the vehicle's field of view. A mean value is calculated from the measured distances of the different objects whose contrast constitutes a minimum value still adequately detectable by the human eye, which then indicates range of vision SW. Alternatively, the greatest distance among the measured distances to the different objects whose contrast constitutes a minimum value still detectable by the human eye may be considered the range of vision.

If, as mentioned above, the distances and contrasts of a plurality of different objects are measured, the radar or lidar sensor and the video sensor are both oriented to the object in question for which measurements are to be taken. To accomplish this, processor PZ sends a direction control signal RS to individual sensors RLS and VK. Direction control signal RS causes video camera VK to orient its optical axis to the same segment within the vehicle's field of view as the beam axis of radar or lidar sensor RLS.

FIG. 3 shows a further example of a range-of-vision sensor SWS. This is a binocular video sensor that includes two video cameras VK1 and VK2 arranged at a defined distance from one another. Using a stereo video camera system VK1, VK2 of this kind, the triangulation method, which is known per se, can be used to calculate the distances to objects from the distance between the two cameras VK1 and VK2 and the angle of orientation of their optical axes. Thus output signals S1 and S2 of binocular video sensor VK1, VK2 contain information regarding the distances and contrasts of one or more objects in the vehicle's field of view. Processor PZ processes the measured distances and contrasts in the same way as described above with reference to range-of-vision sensor SWS shown in FIG. 2.

To measure distance, radar or lidar sensor RLS, which sends a measured distance signal S3 to processor PZ, may also be used. By using two different distance measuring systems—RLS in addition to VK1, VK2—it is possible to measure distances to objects that can only be detected by radar or lidar using sensor RLS and to objects such as lane markings that can only be detected by video sensor using binocular video sensor VK1, VK2.

Figure 4:
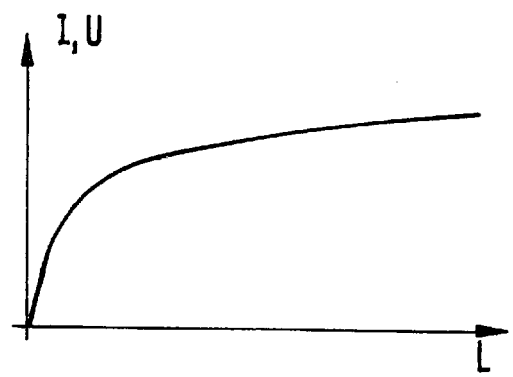
FIG. 4 shows a characteristic curve of a video camera transducer.

Video cameras VK, VK1, VK2 preferably have a non-linear transducer characteristic curve that describes the relationship between incoming light intensity L and its electrical output signal (current I or voltage U), the gradient of the characteristic curve decreasing as the light intensity increases. A transducer characteristic curve of this kind is shown in FIG. 4. A video camera having a non-linear characteristic curve can record the scene in high resolution even if the brightness dynamic range is high and can thus obtain very precise contrast measurements.

In the case of the exemplary embodiment shown in FIG. 1, the vehicle has a headway control device ACC. It also has a device SGV, which the driver uses to predefine a maximum desired speed. If determined range of vision SW falls below a minimum value, this being determined by a threshold decision circuit SE, threshold decision circuit SE sends a signal SE1 to headway control device ACC and deactivates it. There is then no longer any danger that headway control device ACC might set a driving speed that is not in line with the prevailing visibility conditions. Once device ACC has been deactivated, it is entirely up to the driver to modify the vehicle's speed based on the range of vision.

If range of vision SW falls below a value predefined by threshold decision circuit SE, this circuit sends a control signal SE2 to device SGV that is used to predefine a maximum desired speed. Using control signal SE2, the predefined desired speed is limited based on the range of vision. The lower the range of vision, the lower the maximum desired speed that the driver can predefine. If the driver tries to set a desired speed that is greater than visibility permits, device SGV will not accept this predefined driving speed. Otherwise the desired speed is adjusted based on the range of vision. The lower the range of vision, the lower the value to which the predefined desired speed is set. If visibility improves, the predefined desired speed is automatically increased until it reaches the maximum desired speed predefined by the driver.

A display AZ, which informs the driver of current range of vision SW, is also located inside the vehicle. This display AZ can also be used to signal to the driver that headway control device ACC has been deactivated and/or that the maximum desired speed that he has predefined has been reduced based on the current range of vision.

What is claimed is:

1. A method for determining a range of vision in a field of view in front of a vehicle, comprising the steps of:
   measuring a contrast of at least one object located in the field of view using video technology;
   causing one of a radar and a lidar sensor to measure a distance to the at least one object;
   causing a monocular video sensor to measure the contrast of the at least one object detected by the one of the radar and lidar sensor; and
   determining the range of vision from measured values supplied by the one of the radar and the lidar sensor and by the monocular video sensor.

2. A method for determining a range of vision in a field of view in front of a vehicle, comprising the steps of:
   measuring a contrast of at least one object located in the field of view using video technology;
   causing a binocular video sensor to measure a distance to the at least one object and to measure a contrast of the at least one object; and
   determining the range of vision from values corresponding to the measured contrast and the distance.

3. The method according to claim 2, wherein:
   the step of measuring is performed by one of a radar and a lidar sensor.

4. The method according to claim 1, wherein:
   the measured distance to the at least one object whose measured contrast is still adequately detectable by the human eye corresponds to the range of vision.

5. The method according to claim 1, further comprising the step of:
   bringing in line the video sensor with a wavelength range that is detectable by the human eye.

6. The method according to claim 1, wherein:
   the contrast measurement is carried out by the video sensor,
   the method further includes the step of orienting the contrast measurement to the at least one object whose distance relative to the vehicle is changing, and
   the contrast measurement and the distance measurement are carried out iteratively.

7. The method according to claim 1, further comprising the step of:
   calculating a mean of measured distances to different ones of the at least one object whose contrast corresponds to a minimum value still adequately detectable by the human eye, wherein:
   the mean indicates the range of vision.

8. The method according to claim 1, wherein:
   the range of vision corresponds to a greatest distance among distances to different ones of the at least one object whose contrast constitutes a minimum value still detectable by the human eye.

9. The method according to claim 1, wherein:
   each contrast measurement is carried out a plurality of times, and
   the method further comprises the step of determining a mean contrast value from the contrast measurements.

10. The method according to claim 1, wherein:
    the video sensor exhibits a non-linear transducer characteristic curve corresponding to a relationship between an incoming light intensity and an electrical output signal of the video sensor, and
    a gradient of the non-linear transducer characteristic curve decreases as the incoming light intensity increases.

11. The method according to claim 1, further comprising the step of:
    deactivating a headway control device in the vehicle if the range of vision has been determined t o fall below a minimum value.

12. The method according to claim 1, further comprising the step of
    controlling a predefined maximum desired speed as a function of a current determined range of vision.

13. The method according to claim 1, further comprising the step of:
    indicating to a driver inside the vehicle a current range of vision.

14. The method according to claim 11, further comprising the step of:
    sending a signal to a driver inside the vehicle indicating that the headway control device has been deactivated.

15. The method according to claim 12, wherein:
    the predefined maximum desired speed is predefined by a driver inside the vehicle, and
    the method further comprises the step of sending a signal to the driver inside the vehicle indicating that the predefined maximum desired speed has been reduced based on a current range of vision.

16. The method according to claim 2, wherein:
    the measured distance to the at least one object whose measured contrast is still adequately detectable by the human eye corresponds to the range of vision.

17. The method according to claim 2, wherein:
    the contrast measurement is carried out by the video sensor,
    the method further includes the step of orienting the contrast measurement to the at least one object whose distance relative to the vehicle is changing, and
    the contrast measurement and the distance measurement are carried out iteratively.

18. The method according to claim 2, further comprising the step of:
    calculating a mean of measured distances to different ones of the at least one object whose contrast corresponds to a minimum value still adequately detectable by the human eye, wherein:
    the mean indicates the range of vision.

19. The method according to claim 2, wherein:
    the range of vision corresponds to a greatest distance among distances to different ones of the at least one object whose contrast constitutes a minimum value still detectable by the human eye.

20. The method according to claim 2, further comprising the step of:

deactivating a headway control device in the vehicle if the range of vision has been determined to fall below a minimum value.

21. The method according to claim 2, further comprising the step of:

controlling a predefined maximum desired speed as a function of a current determined range of vision.

22. The method according to claim 2, further comprising the step of:

indicating to a driver inside the vehicle a current range of vision.

23. The method according to claim 20, further comprising the step of:

sending a signal to a driver inside the vehicle indicating that the headway control device has been deactivated.

24. The method according to claim 21, wherein:

the predefined maximum desired speed is predefined by a driver inside the vehicle, and the method further comprises the step of sending a signal to the driver inside the vehicle indicating that the predefined maximum desired speed has been reduced based on a current range of vision.

* * * * *